US012380911B2

(12) United States Patent
Fujino et al.

(10) Patent No.: US 12,380,911 B2
(45) Date of Patent: Aug. 5, 2025

(54) AUDIO INPUT DEVICE

(71) Applicants: FAIRY DEVICES INC., Tokyo (JP); DAIKIN INDUSTRIES, LTD., Osaka (JP)

(72) Inventors: Masato Fujino, Tokyo (JP); Yuichiro Takezaki, Tokyo (JP)

(73) Assignees: Fairy Devices Inc., Tokyo (JP); Daikin Industries, Ltd., Osaka (JP)

( * ) Notice: Subject to any disclaimer, the term of this patent is extended or adjusted under 35 U.S.C. 154(b) by 322 days.

(21) Appl. No.: 18/014,752

(22) PCT Filed: Jun. 16, 2021

(86) PCT No.: PCT/JP2021/022813
§ 371 (c)(1),
(2) Date: Jan. 6, 2023

(87) PCT Pub. No.: WO2022/009626
PCT Pub. Date: Jan. 13, 2022

(65) Prior Publication Data
US 2023/0290369 A1    Sep. 14, 2023

(30) Foreign Application Priority Data
Jul. 6, 2020   (JP) .................. 2020-116321

(51) Int. Cl.
*G10L 21/028* (2013.01)
*G10L 21/0216* (2013.01)
(Continued)

(52) U.S. Cl.
CPC ........ *G10L 21/028* (2013.01); *G10L 21/0216* (2013.01); *H04R 1/406* (2013.01);
(Continued)

(58) Field of Classification Search
CPC ............... G10L 21/028; G10L 21/0216; G10L 2021/02166; H04R 3/005; H04R 1/406;
(Continued)

(56) References Cited

U.S. PATENT DOCUMENTS

2011/0091057 A1* 4/2011 Derkx ................. H04R 25/407
381/313
2013/0208896 A1* 8/2013 Chatlani ................. H04R 5/04
381/17
(Continued)

FOREIGN PATENT DOCUMENTS

CN    109660891 A  *  4/2019
JP    WO2018/051663 A1   3/2018
(Continued)

OTHER PUBLICATIONS

International Search Report of International Patent Application No. PCT/JP2021/022813 completed on Aug. 5, 2021 and mailed Aug. 17, 2021 (5 pages).

(Continued)

Primary Examiner — Yogeshkumar Patel
(74) Attorney, Agent, or Firm — Pyprus Pte Ltd; George D. Liu

(57) ABSTRACT

[Problem] To provide an audio-input device with which it is possible to properly acquire also the audio of a conversation held between a wearer of said device and two other conversation participants.[Solution] This audio-input device 100 is provided with: a first arm 10 and a second arm 20 which can be arranged at positions such that a target sound source is interposed therebetween; and a plurality of sound collection parts 41-46 provided in a quantity of at least three for each of the first arm 10 and the second arm 20 (a total quantity of at least six).

6 Claims, 7 Drawing Sheets

(51) Int. Cl.
  *H04R 1/40* (2006.01)
  *H04R 3/00* (2006.01)
(52) U.S. Cl.
  CPC .... *H04R 3/005* (2013.01); *G10L 2021/02166* (2013.01); *H04R 2201/401* (2013.01)
(58) Field of Classification Search
  CPC ............ H04R 5/0335; H04R 2201/401; H04R 2201/028; H04R 2420/07; H04R 2460/03; H04R 2460/07; G01S 3/80; G01S 5/18
  See application file for complete search history.

(56) References Cited

U.S. PATENT DOCUMENTS

| | | | |
|---|---|---|---|
| 2017/0280235 A1 | 9/2017 | Varerkar | |
| 2017/0280239 A1* | 9/2017 | Sekiya | H04R 3/00 |
| 2017/0303052 A1* | 10/2017 | Kakareka | G01S 3/86 |
| 2019/0028817 A1* | 1/2019 | Gabai | H04R 25/407 |
| 2019/0138603 A1 | 5/2019 | Daley et al. | |

FOREIGN PATENT DOCUMENTS

| | | |
|---|---|---|
| JP | WO2018/055898 A1 | 3/2018 |
| JP | 2016-144134 A | 8/2018 |
| JP | 2019-110593 A | 7/2019 |
| JP | 2019-122035 A | 7/2019 |
| JP | 2019-134441 A1 | 8/2019 |

OTHER PUBLICATIONS

Written Opinion of International Patent Application No. PCT/JP2021/022813 completed on Aug. 5, 2021 and mailed Aug. 17, 2021 (3 pages).

Extended European Search Report for European patent application No. 21837976.6 dated Jun. 5, 2024 (9 pages).

Examination Report for Indian patent application No. 202347002218 dated Apr. 27, 2023 (6 pages).

Hearing Notice for Indian patent application No. 202347002218 dated Jun. 12, 2024 (2 pages).

\* cited by examiner

[Fig. 1]

[Fig. 2]
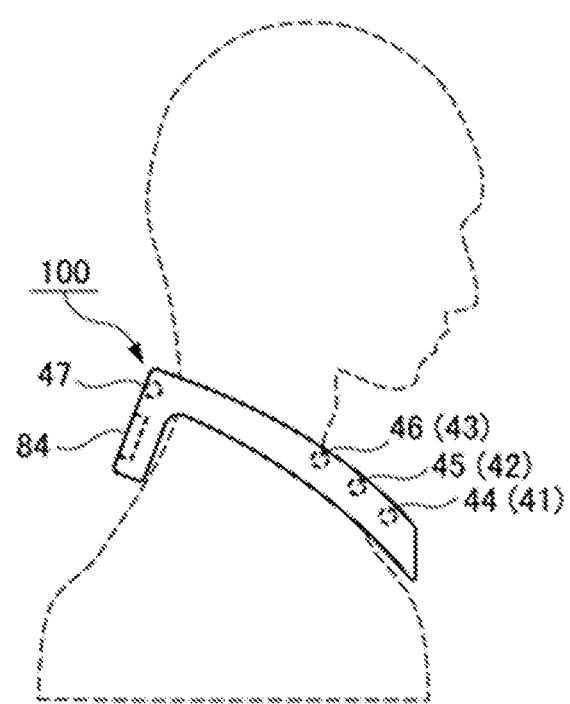

[Fig. 3]
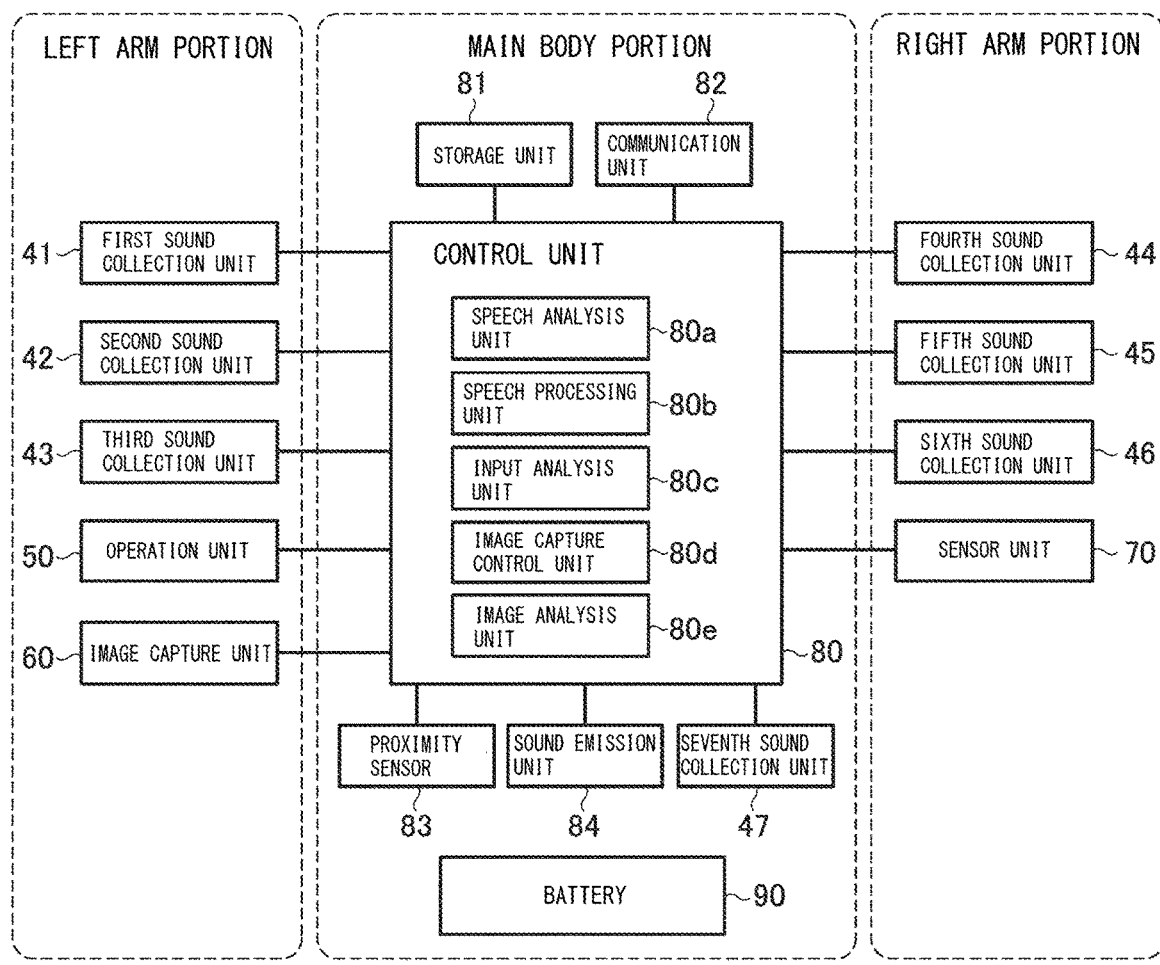

[Fig. 4]
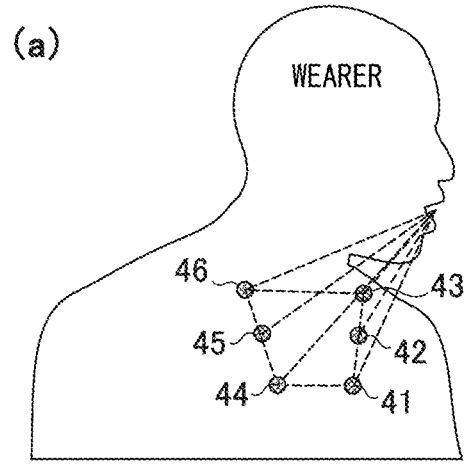
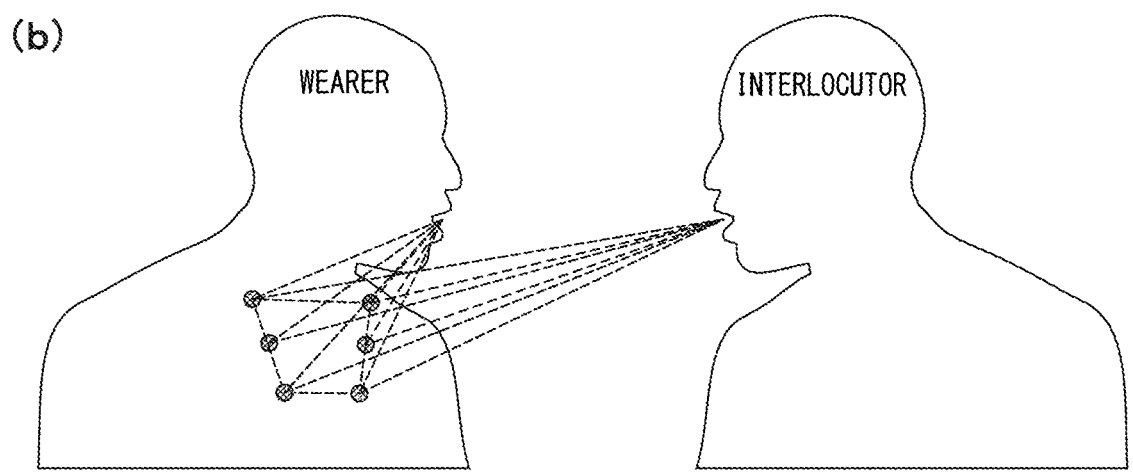

[Fig. 5]
Fig.5
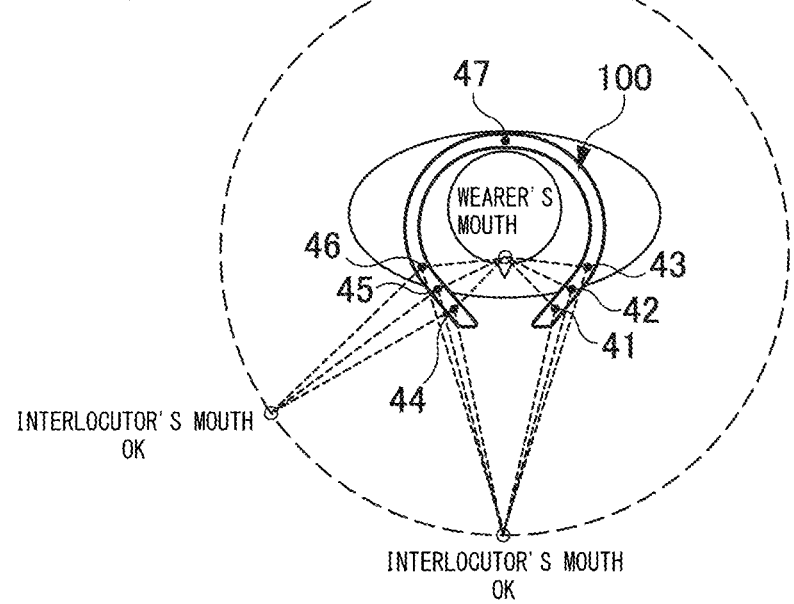
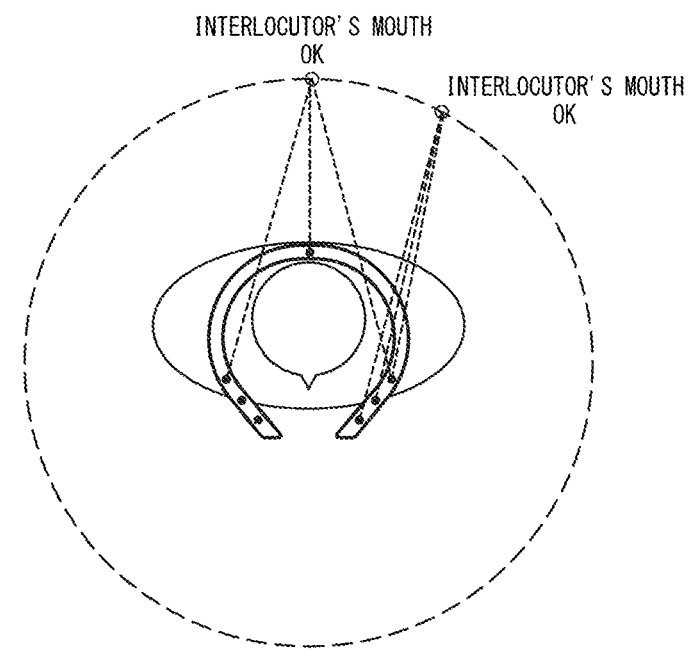

[Fig. 6]
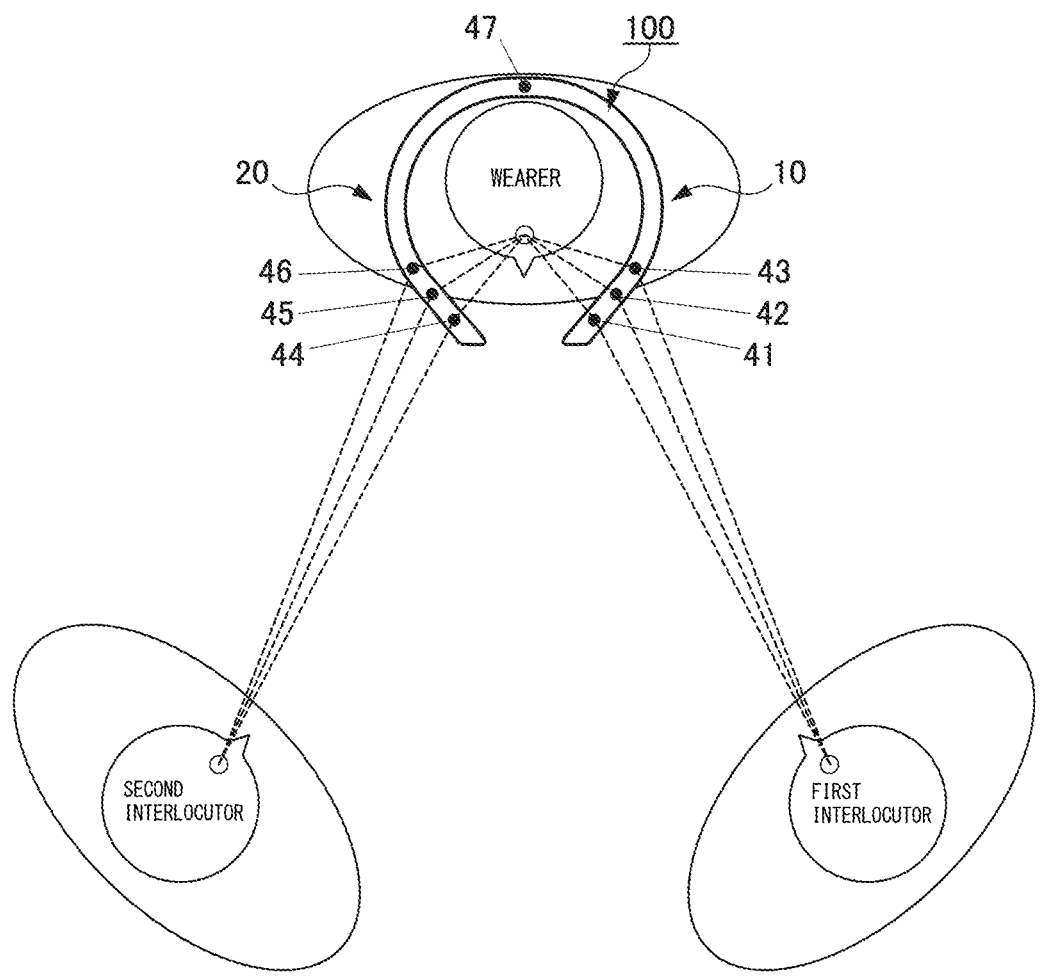

[Fig. 7]
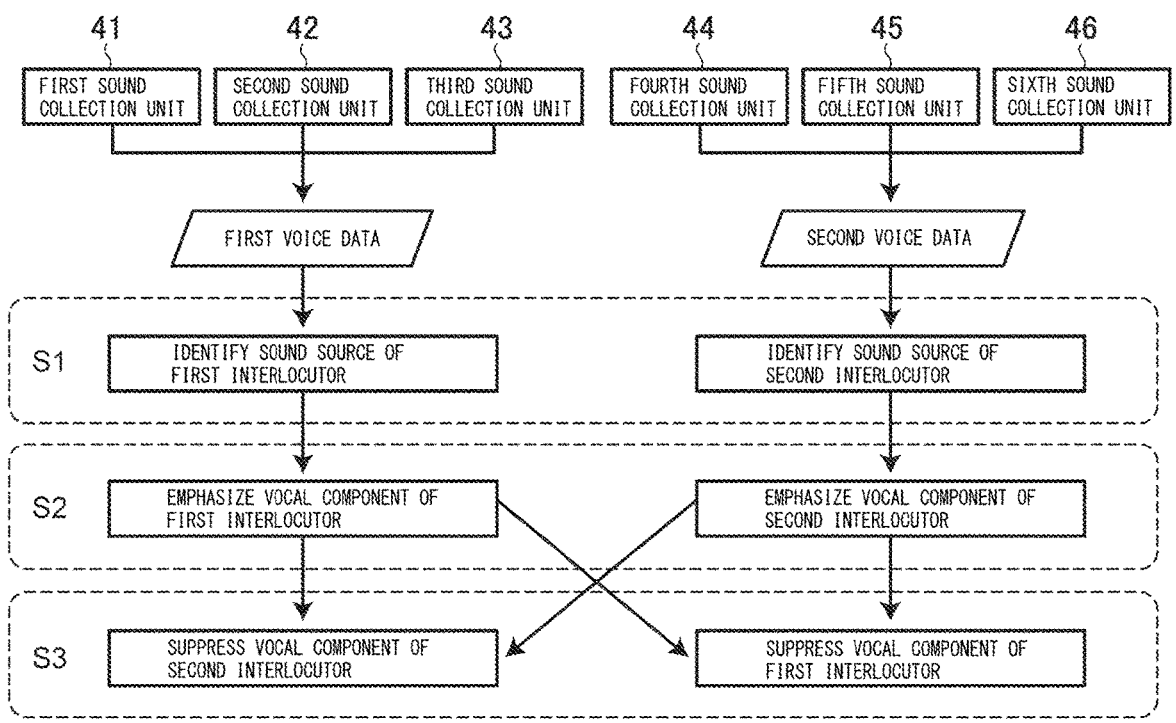

AUDIO INPUT DEVICE

TECHNICAL FIELD

The present invention relates to an audio-input device. More specifically, the present invention relates to a neck-mounted device that is wearable around a neck of a wearer and appropriate for acquiring audio of the wearer and a person in conversation with the wearer.

BACKGROUND ART

In recent years, wearable devices that can be worn on any part of a user's body to sense the state of the user and the state of the surrounding environment have been attracting attention. Various forms of wearable devices are known, such as those that can be worn on the user's arm, eyes, ears, neck, or clothing worn by the user. The user information collected by such a wearable device is analyzed, so that it is possible to acquire information useful for the wearer and other persons.

Further, as one type of wearable device, a device is known that can be worn around the neck of a user to record a voice emitted from the wearer or an interlocutor (Patent Document 1, Patent Document 2). Patent Document 1 discloses a speech processing system including a wearing portion worn by a user, and the wearing portion has at least three voice acquisition units (microphones) for acquiring voice data for beamforming. In the system disclosed in Patent Document 1, the voice acquisition units are disposed to respective right and left arm portions disposed across the wearer's mouth. Especially, Patent Document 1 proposes a preferred embodiment in which three voice acquisition units are disposed to the left side arm portion, and one voice acquisition unit is disposed to the right side arm portion. Furthermore, in Patent Document 1, it is preferred that one of the four voice acquisition units is arranged so as to face the feet side of the wearer for suppressing the noise (road noise) coming from the direction of the ground.

Patent Document 2 discloses a wearable device to be worn around a user's neck, and the device includes voice acquisition units (microphone array) disposed at two positions of each of right and left arm portions (four positions in total). Patent Document 2 discloses that the device acquires a voice coming from the mouth of the interlocutor facing the person wearing the device by the microphone array.
Patent Document 1: JP 2019/134441 A
Patent Document 2: US 2019/0138603 A1

DISCLOSURE OF THE INVENTION

Problems to be Solved by the Invention

Incidentally, in the system of Patent Document 1, since a plurality of microphones are disposed around the wearer's mouth, the voice uttered by the wearer can be extracted by a beamforming process. However, in this system, since the microphones are disposed at three positions on one arm portion while the microphone is disposed at only one position on the other arm portion, the range in which the sound generated around the wearer (environmental sound, interlocutor's voice, and the like) can be appropriately acquired is unevenly distributed to any one region of the wearer's right and left sides. That is, for emphasizing a specific sound (voice of wearer or interlocutor, or the like) or suppressing other noise by the beamforming process, the specific sound needs to linearly reach at least three microphones. At this time, for example, when the specific sound is generated in the right side of the wearer, the specific sound linearly reaches the microphones disposed at three positions on the right side arm portion. However, when the specific sound is generated in the left side of the wearer, since only one microphone is disposed on the left side arm portion, the sound is blocked by the wearer's neck or the like depending on the specific sound generated position, thus making it difficult that the specific sound linearly reaches the microphones at three or more positions. In this case, the beamforming process highly possibly fails to be appropriately performed to the sound generated in the wearer's left side. Thus, the system of Patent Document 1 premises that a plurality of microphones are disposed to be unevenly distributed, and while the system can acquire the voice uttered by the wearer's mouth, the system is not designed to be appropriate for acquiring the other surrounding environmental sound.

Since the device of Patent Document 2 includes the microphones at two positions in each of the right and left arm portions (four in total), it is considered that the beamforming process can be more effectively performed to the voices from the wearer and the interlocutor compared with the system of Patent Document 1. However, the device of Patent Document 2 assumes only up to the conversation between the wearer and one interlocutor. Specifically, it is difficult for the device of Patent Document 2 to individually perform the beamforming process to voices from respective persons in the conversation between three persons in total, the wearer and two interlocutors. That is, for appropriately performing the beamforming process, it is necessary to acquire a sound by the microphones of at least three positions for one sound source, identify a spatial position of the sound source from sound components acquired by the respective microphones, and emphasize the sound component from the sound source or suppress the other sound components. Here, assume that there are two interlocutors facing the wearer, and the two interlocutors simultaneously speak. When the microphones are disposed at only four positions like the device of Patent Document 2, for the microphones of at least two positions, sound source positions of the two interlocutors cannot be accurately identified unless the sound components from the two interlocutors are separated from the sound components acquired by the two microphones. In view of this, there has been a problem that the device of Patent Document 2 fails to perform the appropriate beamforming process in a conversation situation including the wearer and two interlocutors in some cases. When it is assumed that an interlocutor is present in the left rear or the right rear of the wearer, in the case where the microphones are disposed at only four positions like the device of Patent Document 2, the voice of the interlocutor does not linearly reach the microphones at three positions due to the obstruction by the wearer's head in some cases. In view of this, there has been a problem that a range (inaudible range) in which the beamforming cannot be performed is widely present in the rear of the wearer.

Therefore, it is a main object of the present invention to provide an audio-input device capable of appropriately acquiring even a voice in a conversation between a wearer and two interlocutors.

Solutions to the Problems

The inventors of the present invention seriously examined means to solve the problems of the related art, and found that disposing sound collection units (microphones) at three or more positions (six or more positions in total) for each of two arm portions arranged at positions across a target sound source enables simultaneously acquiring voices in a conversation between a wearer and two interlocutors. The inventors have come up with the idea that the problem in the related art can be solved based on the above-described finding, thus completing the present invention. Specifically, the present invention has the following configuration.

The present invention relates to an audio-input device. The audio-input device according to the present invention includes two arm portions and a plurality of sound collection units. The two arm portions are configured to be located at positions across a target sound source. An example of the target sound source is a wearer's mouth. The sound collection units are disposed at three or more positions for each of the two arm portions. Specifically, the sound collection units are disposed at three or more positions on one arm portion, and at 32 or more positions on the other arm portion. The sound collection units may be disposed at four or more positions or five or more positions for each arm portion. A preferred embodiment of the audio-input device according to the present invention is a neck-mounted device worn around the user's neck. However, the audio-input device may have another form such as an eyeglass type or an ear mounted type insofar as the audio-input device includes arm portions configured to be located at positions across a target sound source (wearer's mouth).

By disposing the sound collection units at three or more positions on each of the two arm portions like the above-described configuration, not only the sound emitted from the target sound source (for example, wearer's mouth) between the arm portions, but also the sound generated around the target sound source can be also simultaneously acquired. Especially, even when two interlocutors facing the wearer simultaneously speak, the vocal component of the first interlocutor can be emphasized based on the voices acquired by the sound collection units at three positions on one arm portion, and the vocal component of the second interlocutor can be emphasized based on the voices acquired by the sound collection units at three positions on the other arm portion. Therefore, even in the conversation between three persons in total, the wearer and the two interlocutors, the appropriate speech processing can be performed to the voices of all persons. Since disposing the sound collection units at three or more positions for each of the two arm portions enables acquiring the voice of the interlocutor by the sound collection units on one arm portion, even when the interlocutor is present at the left rear or the right rear of the wearer, the beamforming process can be performed to the voice of the interlocutor. That is, with the configuration of the present invention, a range in which the beamforming process cannot be performed (inaudible range) present in the rear of the wearer can be reduced.

The audio-input device according to the present invention preferably further includes a speech analysis unit. The speech analysis unit identifies a spatial position or direction of a sound source based on a sound emitted by the sound source and acquired by each of the sound collection units. The speech analysis unit may obtain a difference of acquiring time of the sound acquired by each sound collection unit, and identify the position or the direction of the sound source of the sound based on the difference of the acquiring time. The speech analysis unit can identify the spatial position or direction of the sound source based on the sound emitted by the sound source and acquired by each sound collection unit with reference to a trained model after machine learning. This allows performing what is called a beamforming process that emphasizes or suppress a sound corresponding to the position or the direction of the sound source of the sound acquired by each sound collection unit.

The audio-input device according to the present invention is preferably a neck-mounted device, and the target sound source is preferably a mouth of a wearer. For recording the voices of the wearer and the interlocutor, a neck-mounted device is appropriately used.

In the audio-input device according to the present invention, the speech analysis unit preferably determines whether or not the sound source identified based on the sounds acquired by the three or more sound collection units disposed on the first arm portion matches a mouth of a first interlocutor present in the first arm portion side of the wearer, and preferably determines whether or not the sound source identified based on the sounds acquired by the three or more sound collection units disposed on the second arm portion matches a mouth of a second interlocutor present in the second arm portion side of the wearer. This allows recording the voice of the first interlocutor by the three or more sound collection units on the first arm portion and performing the voice emphasis thereof, and recording the voice of the second interlocutor by three or more microphones on the second arm portion and performing the voice emphasis thereof. Thus, by independently using the sound collection units on the first arm portion and the sound collection units on the second arm portion, the separation performance of the vocal components of the respective speakers can be improved when the first interlocutor and the second interlocutor simultaneously speak.

The audio-input device according to the present invention preferably further includes a speech processing unit. The speech processing unit performs a process of emphasizing or suppressing a sound component included in voice data acquired by the sound collection units based on the position or the direction of the sound source identified by the speech analysis unit. Alternatively, the speech processing unit may simultaneously perform the emphasizing process and the suppressing process of the sound components included in the voice data acquired by the sound collection units based on the position or the direction of the sound source identified by the speech analysis unit. For example, for the voice data of the wearer acquired by the sound collection units on the first arm portion, the vocal component of the first interlocutor is emphasized based on the sound component acquired by the sound collection units on the first arm portion, and simultaneously, the components (mainly, vocal component of second interlocutor) other than the vocal component of the first interlocutor are suppressed using the sound components acquired by the sound collection units on the second arm portion. Similarly, for the voice data of the wearer acquired by the sound collection units on the second arm portion, the vocal component of the second interlocutor is emphasized based on the sound component acquired by the sound collection units on the second arm portion, and simultaneously, the components (mainly, vocal component of first interlocutor) other than the vocal component of the second interlocutor are suppressed using the sound components acquired by the sound collection units on the first arm portion. Thus, the vocal components of the first interlocutor and the second interlocutor can be emphasized or suppressed independently using the sound collection units on the first arm portion and the sound collection units on the second arm portion.

The audio-input device according to the present invention may be a neck-mounted device, and the audio-input device may further include one or a plurality of sound collection units at positions corresponding to a back of a wearer's neck. By thus disposing the sound collection unit at the position corresponding to the back of the wearer's neck, the sound in the wearer's back side also can be appropriately collected. Especially, in addition to disposing the sound collection units at three positions for each of the left and right arm portions, by further disposing the sound collection unit at the back of the wearer's neck, the beamforming can be performed also to the sound source in the wearer's back side. The number of the additional sound collection units disposed at the back of the wearer's neck may be one, or may be two or more. For performing the beamforming to the sound source in the wearer's back side by only the additional sound collection unit disposed at the back of the wearer's neck, three or more sound collection units may be disposed.

Advantageous Effects of the Invention

The present invention can provide an audio-input device capable of appropriately acquiring even a voice in a conversation between a wearer and two interlocutors.

BRIEF DESCRIPTION OF THE DRAWINGS

FIG. 2 is a side view schematically illustrating a state where the audio-input device is worn.

FIG. 3 is a block diagram illustrating an exemplary functional configuration of the audio-input device.

FIG. 4 schematically illustrates a beamforming process for acquiring voices of a wearer and one interlocutor.

FIG. 5 schematically illustrates a beamforming process for acquiring voices of a wearer and one interlocutor.

FIG. 6 schematically illustrates a beamforming process for acquiring voices of a wearer and two interlocutors.

FIG. 7 is a flowchart illustrating an exemplary beamforming process for acquiring voices of a wearer and two interlocutors.

Figure 1:
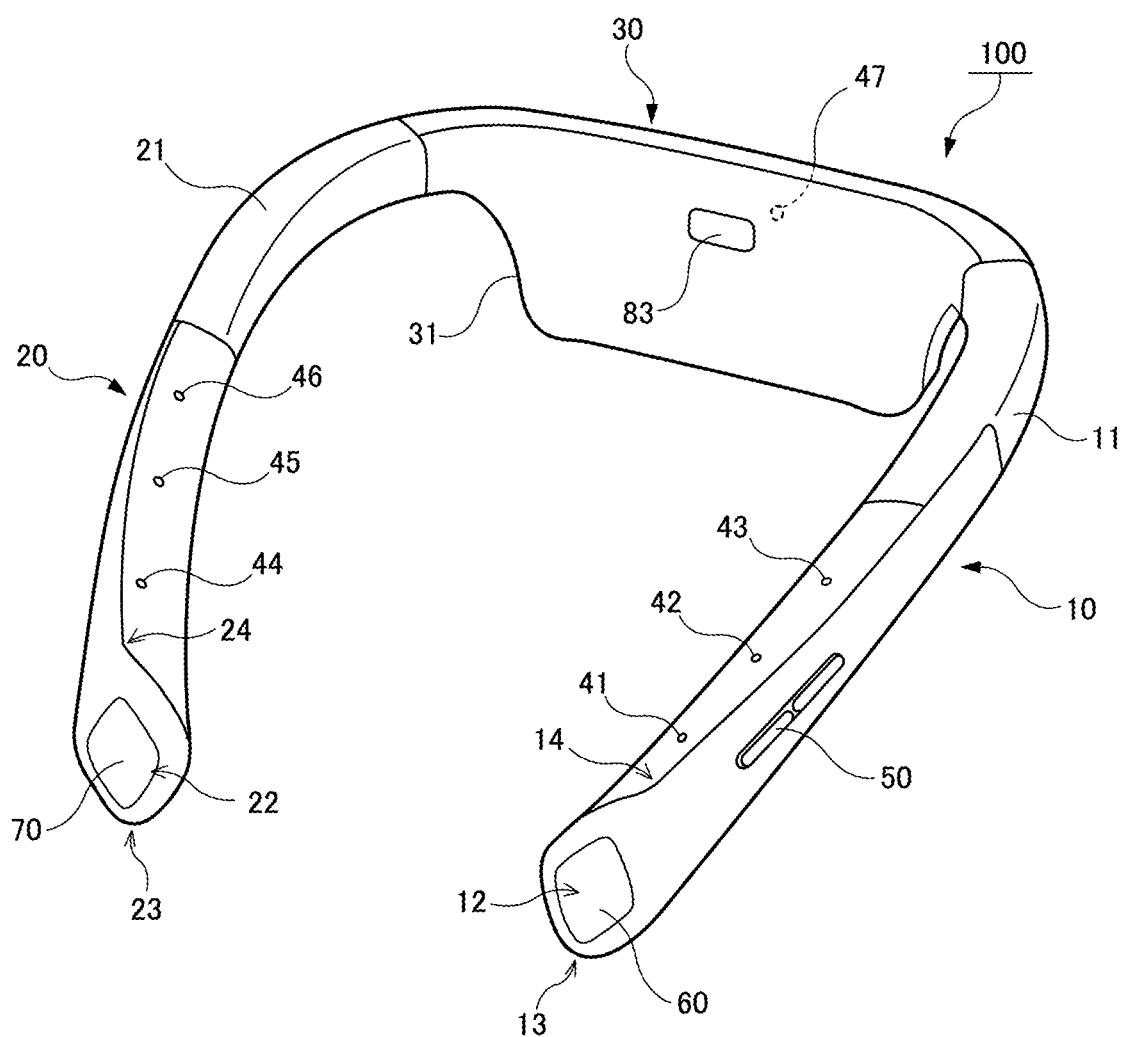
FIG. 1 is a perspective view illustrating an exemplary neck-mounted audio-input device.

DESCRIPTION OF PREFERRED
EMBODIMENTS

An embodiment of the present invention will be described below with reference to the drawings. The present invention is not limited to the embodiment described below, and includes any modifications of the following embodiment as appropriate in the scope obvious to those skilled in the art.

FIG. 1 illustrates a neck-mounted device 100 as one embodiment of an audio-input device according to the present invention. Further, FIG. 2 illustrates a state in which the neck-mounted device 100 is worn. As illustrated in FIG. 1, a housing which forms the neck-mounted device 100 includes a left arm portion 10, a right arm portion 20, and a main body portion 30. The left arm portion 10 and the right arm portion 20 extend forward from the left end and the right end of the main body portion 30, respectively, and the neck-mounted device 100 has a structure in which the device as a whole forms a substantially U shape when viewed in a plan view. When the neck-mounted device 100 is worn, as illustrated in FIG. 2, the entire device is mounted around the neck of a wearer in a way that the main body portion 30 is brought into contact with the back of the neck of the wearer, and the left arm portion 10 and the right arm portion 20 are hung from the sides of the wearer's neck to the chest side. Various electronic components are housed in the housing of the neck-mounted device 100.

A plurality of sound collection units (microphones) 41 to 46 are provided on the left arm portion 10 and the right arm portion 20. The sound collection units 41 to 46 are arranged mainly for the purpose of acquiring voices of the wearer and an interlocutor. As illustrated in FIG. 1, the left arm portion 10 includes the first sound collection unit 41, the second sound collection unit 42, and the third sound collection unit 43, and the right arm portion 20 includes the fourth sound collection unit 44, the fifth sound collection unit 45, and the sixth sound collection unit 46. Further, as an optional element, one or more sound collection units may be additionally provided in the left arm portion 10 and the right arm portion 20. Furthermore, a seventh sound collection unit 47 may be provided as an optional additional element to the main body portion 30 located between the left arm portion 10 and the right arm portion 20. The seventh sound collection unit 47 is arranged at a position corresponding to the back of the wearer's neck, and disposed to acquire a voice from the back of the wearer. Sound signals acquired by these sound collection units 41 to 47 are transmitted to a control unit 80 (see FIG. 3) provided in the main body portion 30 to perform a predetermined analysis process. Note that, the main body portion 30 houses control system circuits such as electronic circuits including such a control unit 80 and a battery.

The first sound collection unit 41 to the sixth sound collection unit 46 are provided on the front sides of the left arm portion 10 and the right arm portion 20 (on the chest side of the wearer). Specifically, assuming that the neck-mounted device 100 is worn around the neck of a general adult male (with a neck circumference of 35 to 37 cm), it is preferable that at least the first sound collection unit 41 to the sixth sound collection unit 46 are designed to be located in front of the wearer's neck (on the chest side). The neck-mounted device 100 is intended to collect the voices of the wearer and the interlocutor at the same time, and the sound collection units 41 to 46 being arranged on the front side of the wearer's neck make it possible to appropriately acquire not only the voice of the wearer but also the voice of the interlocutor. It is preferable that the first sound collection unit 41 to the third sound collection unit 43 on the left arm portion 10 and the fourth sound collection unit 44 to the sixth sound collection unit 46 on the right arm portion 20 are arranged to be bilaterally symmetrical. Specifically, a first sound collection unit 41, the second sound collection unit 42, and the third sound collection unit 43 are arranged at line-symmetric positions to the fourth sound collection unit 44, the fifth sound collection unit 45, and the sixth sound collection unit 46, respectively.

The left arm portion 10 is further provided with an image capture unit 60. Specifically, the image capture unit 60 is provided on a tip surface 12 of the left arm portion 10, so that the image capture unit 60 can capture a still image or a moving image on the front side of the wearer. The image acquired by the image capture unit 60 is transmitted to the control unit 80 in the main body portion 30 and stored as image data. Further, the image acquired by the image capture unit 60 may be transmitted to a server device via the Internet. Further, a process (beamforming process) may also be performed in which the position of the mouth of the interlocutor is identified from the image acquired by the image capture unit 60 and the voice emitted from the mouth is emphasized.

The right arm portion 20 is further provided with a non-contact type of sensor unit 70. The sensor unit 70 is disposed on a tip surface 22 of the right arm portion 20 mainly for the purpose of detecting the movement of the wearer's hand on the front side of the neck-mounted device 100. The detection information from the sensor unit 70 is used mainly for controlling the image capture unit 60, such as activating the image capture unit 60 and starting and stopping shooting. For example, the sensor unit 70 may be configured to control the image capture unit 60 in response to detecting that an object such as the wearer's hand is close to the sensor unit 70, or may be configured to control the image capture unit 60 in response to detecting that the wearer has performed a predetermined gesture within the detection range of the sensor unit 70. Note that, in the present embodiment, the image capture unit 60 is disposed on the tip surface 12 of the left arm portion 10, and the sensor unit 70 is disposed on the tip surface 22 of the right arm portion 20, but the positions of the image capture unit 60 and the sensor unit 70 may be reversed.

Further, the detection information from the sensor unit 70 may be used to activate the image capture unit 60, the sound collection units 41 to 47, and/or the control unit 80 (main CPU). For example, in the state where the sensor unit 70, the sound collection units 41 to 47, and the control unit 80 are constantly activated and the image capture unit 60 is stopped, when the sensor unit 70 detects a specific gesture, the image capture unit 60 may be activated (Condition 1). Note that, under this Condition 1, the image capture unit 60 may be activated when any of the sound collection units 41 to 47 detects a specific voice. Alternatively, in the state where the sensor unit 70 and the sound collection units 41 to 47 are constantly activated and the control unit 80 and the image capture unit 60 are stopped, when the sensor unit 70 detects a specific gesture, any one of the control unit 80 and the image capture unit 60 may be activated (Condition 2). Even under this Condition 2, the control unit 80 and the image capture unit 60 may be activated when any of the sound collection units 41 to 47 detects a specific voice. Alternatively, in the state where only the sensor unit 70 is constantly activated and the sound collection units 41 to 47, the control unit 80, and the image capture unit 60 are stopped, when the sensor unit 70 detects a specific gesture, any one of the sound collection units 41 to 47, the control unit 80, and the image capture unit 60 may be activated (Condition 3). It can be said that for Conditions 1 to 3 described above, the effect of reducing power consumption is greater in the order of Condition 3>Condition 2>Condition 1.

The above-described left arm portion 10 and right arm portion 20 can be arranged at the positions across the base of the neck. The left arm portion 10 and the right arm portion 20 are connected by the main body portion 30 provided at a position where the back of the wearer's neck comes into contact with. This main body portion 30 houses electronic components (control system circuits) such as a processor and a battery. As illustrated in FIG. 1, the housing which forms the main body portion 30 has a substantially flat shape, and can house a flat (plate-shaped) circuit board and a battery. Further, the main body portion 30 has a hanging portion 31 extending downward with respect to the left arm portion 10 and the right arm portion 20. The hanging portion 31 being provided in the main body portion 30 secures a space for housing the control system circuits. The control system circuits are concentratedly mounted in the main body portion 30. The control system circuits include a battery and a circuit board on which various kinds of electronic components, such as a processor, driven by receiving the supply of electric power from the battery are mounted. Therefore, based on the total weight 100% of the neck-mounted device 100, the weight of the main body portion 30 occupies 40 to 80% or 50% to 70%. By disposing such a heavy main body portion 30 on the back of the wearer's neck, the stability during wearing is improved. Further, by disposing the heavy main body portion 30 at the position near the trunk of the wearer, the load on the wearer due to the weight of the entire device can be reduced.

Further, a proximity sensor 83 is provided inside the main body portion 30 (on the wearer side). The proximity sensor 83 may be mounted on the inner surface of a circuit board 85, for example. The proximity sensor 83 is for detecting the approach of an object, and when the neck-mounted device 100 is worn around the wearer's neck, the proximity sensor 83 detects the approach of the neck. Accordingly, when the proximity sensor 83 is in a state of detecting the proximity of an object, devices such as the sound collection units 41 to 47, the image capture unit 60, and the sensor unit 70 may be turned on (activated state); when the proximity sensor 83 is in a state of not detecting the proximity of an object, these devices may be turned off (sleep state) or may not be activated. As a result, the power consumption of a battery 90 can be efficiently suppressed. Further, when the proximity sensor 83 is in a state of not detecting the proximity of an object, the image capture unit 60 and the sound collection units 41 to 47 may be prohibited to be activated. Therefore, it can also be expected to have the effect of preventing data from being recorded intentionally or unintentionally during not wearing. In addition, a known proximity sensor 90 may be used, but for an optical type as used, in order to transmit the detection light of the proximity sensor 90, a transmissive portion 32a for transmitting the detection light may be provided in a main body housing 32.

The seventh sound collection unit 47 as an optional additional element may be separately controlled from the first sound collection unit 41 to the sixth sound collection unit 46. That is, the seventh sound collection unit 47 is disposed to acquire a voice from a direction of the wearer's back, and it is not necessary to acquire a voice from the forward side of the wearer by the seventh sound collection unit 47. Therefore, in a usual scene, the seventh sound collection unit 47 need not be activated when the first sound collection unit 41 to the sixth sound collection unit 46 are activated at first. Meanwhile, when a voice from the wearer's back direction is detected by the first sound collection unit 41 to the sixth sound collection unit 46, or when a voice to which the beamforming cannot be appropriately performed is detected by these sound collection units 41 to 46, the seventh sound collection unit 47 is activated. Thus, for the seventh sound collection unit 47, on/off is controlled independently from the first sound collection unit 41 to the sixth sound collection unit 46, thereby allowing the efficient use of the seventh sound collection unit 47 while reducing the power consumption.

Further, a sound emission unit 84 (speaker) is provided on the outside of the main body portion 30 (opposite side of the wearer). The sound emission unit 84 may be mounted on the outer surface of the circuit board 85, for example. As illustrated in FIG. 2, in the present embodiment, the sound emission unit 84 is disposed so as to output sound toward the outside of the main body portion 30. This emission of sound from the back of the wearer's neck to directly behind the wearer makes it difficult for the sound output from the sound emission unit 84 to directly reach the interlocutor present in front of the wearer. This makes it possible to prevent the interlocutor from confusing the voice emitted from the wearer with the sound emitted from the sound emission unit of the neck-mounted device. Further, in the present embodiment in which the first sound collection unit 41 to the sixth sound collection unit 46 are provided in the left arm portion 10 and the right arm portion 20, the sound emission unit 84 being provided at a position corresponding to the back of the wearer's neck makes it possible to set the physical distance between the sound emission unit 84 and the sound collection units 41 to 46 at a maximum. Specifically, when some sound is output from the sound emission unit 84 while the sound collection units 41 to 46 are collecting the voice of the wearer or the interlocutor, the sound (self-output sound) from the sound emission unit 84 may be mixed with the voice of the wearer or the like to be recorded. If the self-output sound is mixed with the voice to be recorded, it interferes with voice recognition. Therefore, it is necessary to remove this self-output sound by echo cancellation process or the like. However, in reality, due to the influence of the vibration of the housing and the like, it is difficult to completely remove the self-output sound even if the echo cancellation process is performed. Therefore, in order to minimize the volume of the self-output sound to be mixed with the voice of the wearer or the like, it is preferable to provide the sound emission unit 84 at a position corresponding to the back of the neck of the wearer as described above to keep a physical distance from the sound collection unit.

Further, it is preferable that the sound emission unit 84 is installed not at a position corresponding to the center at the rear of the wearer's neck but at a position off-centered to the left or right. The reason is that the sound emission unit 84 is closer to either the left or right ear as compared with the case where the sound emission unit 84 is located in the center of the back of the neck. In this way, by disposing the sound emission unit 84 at a position that is not approximately in the center of the main body portion 30 but is off-centered to the left or right, the wearer can hear an output sound clearly with either the left or right ear even when the volume of the output sound is reduced. In addition, when the volume of the output sound is reduced, it becomes difficult for the output sound to reach the interlocutor, so that the interlocutor can avoid confusing the wearer's voice with the output sound of the sound emission unit 84.

Further, as a structural feature of the neck-mounted device 100, the left arm portion 10 and the right arm portion 20 have flexible portions 11 and 21 in the vicinity of the connecting portion with the main body portion 30. The flexible portions 11 and 21 are made of a flexible material such as rubber or silicone. Thus, when the neck-mounted device 100 is worn, the left arm portion 10 and the right arm portion 20 are likely to fit on the wearer's neck and shoulders. In addition, wires for connecting the first sound collection unit 41 to the sixth sound collection unit 46 and an operation unit 50 to the control unit 80 are also inserted in the flexible portions 11 and 21.

FIG. 3 is a block diagram illustrating a functional configuration of the neck-mounted device 100. As illustrated in FIG. 3, the neck-mounted device 100 includes the first sound collection unit 41 to the seventh sound collection unit 47, the operation unit 50, the image capture unit 60, the sensor unit 70, the control unit 80, a storage unit 81, a communication unit 82, the proximity sensor 83, the sound emission unit 84, and the battery 90. In this embodiment, the first sound collection unit 41, the second sound collection unit 42, the third sound collection unit 43, the operation unit 50, and the image capture unit 60 are arranged in the left arm portion 10. The fourth sound collection unit 44, the fifth sound collection unit 45, the sixth sound collection unit 46, and the sensor unit 70 are arranged in the right arm portion 20. The control unit 80, the storage unit 81, the communication unit 82, the proximity sensor 83, the sound emission unit 84, the seventh sound collection unit 47, and the battery 90 are arranged in the main body portion 30. In addition to the functional configuration illustrated in FIG. 3, the neck-mounted device 100 may include module devices included in a general portable information terminal as appropriate, such as sensors including a gyro sensor, an acceleration sensor, a geomagnetic sensor, and a GPS sensor.

As the sound collection units 41 to 47, known microphones such as a dynamic microphone, a condenser microphone, and a MEMS (Micro-Electrical-Mechanical Systems) microphone may be adopted. Each of the sound collection units 41 to 47 converts sound into an electric signal, amplifies the electric signal by an amplifier circuit, converts the resulting signal into digital information by an A/D conversion circuit, and outputs the information to the control unit 80. One object of the neck-mounted device 100 according to the present invention is to acquire not only the voice of the wearer but also the voice of one or more interlocutors existing around the wearer. Therefore, it is preferable to adopt omnidirectional (non-directional) microphones as the sound collection units 41 to 47 so that the sound generated around the wearer can be widely collected.

The operation unit 50 receives an operation input from the wearer. As the operation unit 50, a known switch circuit, touch panel, or the like can be adopted. The operation unit 50 receives, for example, an operation to instruct the start or stop of voice input, an operation to instruct power on/off of the device, an operation to instruct volume up/down of the speaker, and other necessary operations to implement the functions of the neck-mounted device 100. The information input via the operation unit 50 is transmitted to the control unit 80.

The image capture unit 60 acquires image data of a still image or a moving image. A general digital camera may be adopted as the image capture unit 60. The image capture unit 60 is composed of, for example, a shooting lens, a mechanical shutter, a shutter driver, a photoelectric conversion element such as a CCD image sensor unit, a digital signal processor (DSP) that reads an amount of electric charge from the photoelectric conversion element and generates image data, and an IC memory. Further, the image capture unit 60 preferably includes an autofocus sensor (AF sensor) that measures the distance from the shooting lens to the subject, and a mechanism for adjusting the focal distance of the shooting lens according to the distance detected by the AF sensor. The type of AF sensor is not particularly limited, but a known passive type such as a phase difference sensor or a contrast sensor may be used. Further, as the AF sensor, an active type sensor that emits infrared rays or ultrasonic waves to the subject and receives the reflected light or the reflected waves may be used. The image data acquired by the image capture unit 60 is supplied to the control unit 80 and stored in the storage unit 81 to perform a predetermined image analysis process, or is transmitted to a server device via the Internet through the communication unit 82.

Further, the image capture unit 60 preferably includes a so-called wide-angle lens. Specifically, the vertical angle of view of the image capture unit 60 is preferably 100 to 180 degrees, and particularly preferably 110 to 160 degrees or 120 to 150 degrees. Such a wide angle set as the vertical angle of view of the image capture unit 60 makes it possible to shoot a wide area of at least the chest from the head of the interlocutor, and in some cases, to shoot the whole body of the interlocutor. The horizontal angle of view of the image capture unit 60 is not particularly limited, but a wide angle of view of about 100 to 160 degrees is preferably adopted.

Further, since the image capture unit 60 generally consumes a large amount of power, it is preferable that the image capture unit 60 is activated only when necessary and is in a sleep state in other cases. Specifically, the activation of the image capture unit 60 and the start or stop of shooting are controlled based on the detection information from the sensor unit 70 or the proximity sensor 83, and when a certain time elapses after the shooting is stopped, the image capture unit 60 may enter the sleep state again.

The sensor unit 70 is a non-contact type of detection device for detecting the movement of an object such as wearer's fingers. An example of the sensor unit 70 is a proximity sensor or a gesture sensor. The proximity sensor detects, for example, that the wearer's fingers are close to a predetermined range. As the proximity sensor, a known type of sensor such as an optical, ultrasonic, magnetic, capacitive, or thermosensitive sensor may be adopted. The gesture sensor detects, for example, the movement and shape of the wearer's fingers. An example of a gesture sensor is an optical sensor, which irradiates an object with light from an infrared light emitting LED and captures the change in the reflected light with a light receiving element to detect the movement or shape of the object. The detection information from the sensor unit 70 is transmitted to the control unit 80 and is mainly used for controlling the image capture unit 60. Further, it is also possible to control the sound collection units 41 to 47 based on the detection information from the sensor unit 70. Since the sensor unit 70 generally consumes less power, the sensor unit 70 is always preferably activated while the power of the neck-mounted device 100 is turned ON. Further, the sensor unit 70 may be activated when the proximity sensor 83 detects that the neck-mounted device 100 is worn.

The control unit 80 performs a computation process for controlling other elements included in the neck-mounted device 100. As the control unit 80, a processor such as a CPU may be used. The control unit 80 basically reads a program stored in the storage unit 81 and executes a predetermined computation process according to this program. The control unit 80 can also write and read the results of computation according to the program to and from the storage unit 81 as appropriate. As will be described in detail later, the control unit 80 includes a speech analysis unit 80*a*, a speech processing unit 80*b*, an input analysis unit 80*c*, an image capture control unit 80*d*, and an image analysis unit 80*e* to mainly perform a process of controlling the image capture unit 60 and a beamforming process. These elements 80*a* to 80*e* are basically implemented as functions on software. However, these elements may be implemented as a hardware circuit(s).

The storage unit 81 is an element for storing information used for the computation process and the like in the control unit 80 and the results of computation. Specifically, the storage unit 81 stores a program that causes a general-purpose portable information communication terminal to function as a voice input device according to the present invention. When this program is started according to an instruction from a user, the control unit 80 executes a process according to the program. The storage function of the storage unit 81 can be realized by a nonvolatile memory such as an HDD and an SDD. Further, the storage unit 81 may have a function as a memory for writing or reading, for example, the progress of the computation process of the control unit 80. The memory function of the storage unit 81 can be realized by a volatile memory such as a RAM or a DRAM. Further, the storage unit 81 may store ID information unique to the user who possesses it. The storage unit 81 may also store an IP address which is identification information of the neck-mounted device 100 on a network.

In addition, the storage unit 81 may store a trained model used in the beamforming process by the control unit 80. The trained model is an inference model obtained by performing machine learning such as deep learning and reinforcement learning in a server device on the cloud, for example. Specifically, in the beamforming process, sound data acquired by the plurality of sound collection units is analyzed to identify the position or direction of the sound source that generated the sound. In this case, for example, the trained model has been created in advance in a way that a large number of data sets (teacher data) of the position information of the sound source in the server device and the data acquired from the sound generated from the sound source by the plurality of sound collection units are accumulated, and machine learning is performed using the teacher data. Then, when sound data is acquired by the plurality of sound collection units in the individual neck-mounted device 100, the position or direction of the sound source can be efficiently identified by referring to this trained model. In addition, the neck-mounted device 100 may update this trained model at any time by communicating with the server device.

The communication unit 82 is an element for wireless communication with a server device on the cloud or another neck-mounted device. As the communication unit 82, a communication module for wireless communication according to a known mobile communication standard such as 3G (W-CDMA), 4G (LTE/LTE-Advanced), and 5G and/or by a wireless LAN method such as Wi-Fi (registered trademark) may be adopted in order to communicate with a server device or another neck-mounted device via the Internet. In addition, as the communication unit 82, a communication module for proximity wireless communication such as Bluetooth (registered trademark) or NFC may be adopted in order to directly communicate with another neck-mounted device.

The proximity sensor 83 is mainly used for detecting the proximity of the neck-mounted device 100 (particularly the main body portion 30) and the wearer. As the proximity sensor 83, a known type of sensor such as an optical, ultrasonic, magnetic, capacitive, or thermosensitive sensor as described above may be adopted. The proximity sensor 83 is disposed inside the main body portion 30 and detects that the wearer's neck is close to a predetermined range. When the proximity sensor 83 detects the proximity of the wearer's neck, the sound collection units 41 to 47, the image capture unit 60, the sensor unit 70, and/or the sound emission unit 84 can be activated. As described above, when the proximity of the wearer's neck is detected by the proximity sensor 83, it is possible that only the first sound collection unit 41 to the sixth sound collection unit 46 are activated at first, and the seventh sound collection unit 47 is remained to be in the off state until the voice from the wearer's back direction is detected.

The sound emission unit 84 is an acoustic device that converts an electric signal into physical vibration (that is, sound). An example of the sound emission unit 84 is a general speaker that transmits sound to the wearer by air vibration. In this case, as described above, a preferable configuration is that the sound emission unit 84 is provided on the outside of the main body portion 30 (the side opposite to the wearer) to emit sound in the direction away from the back of the wearer's neck (horizontally rearward) or the direction along the back of the neck (vertically upward). Further, the sound emission unit 84 may be a bone conduction speaker that transmits sound to the wearer by vibrating the wearer's bones. In this case, a configuration may be provided in which the sound emission unit 84 is provided inside the main body portion 30 (on the wearer side) so that the bone conduction speaker comes into contact with the bone (cervical spine) on the back of the wearer's neck.

The battery 90 is a battery that supplies electric power to the various electronic components included in the neck-mounted device 100. As the battery 90, a rechargeable storage battery is used. As the battery 90, a known battery may be adopted such as a lithium ion battery, a lithium polymer battery, an alkaline storage battery, a nickel cadmium battery, a nickel hydrogen battery, or a lead-acid battery. The battery 90 is disposed in the housing of the main body portion 30 so that the circuit board is interposed between the battery 90 and the back of the wearer's neck.

Subsequently, the basic concept of the beamforming process will be specifically described with reference to FIG. 4 to FIG. 6. When the user wears the neck-mounted device 100 according to the embodiment illustrated in FIG. 1, the six sound collection units 41 to 46 are located around the wearer's neck on the chest side as illustrated in FIG. 4(*a*) and FIG. 4(*b*). The first sound collection unit 41 to the sixth sound collection unit 46 are all omnidirectional microphones, and always mainly collect the voice emitted from the wearer's mouth and collect other environmental sounds around the wearer. The environmental sounds include the voices of interlocutors located around the wearer. When the wearer and/or the interlocutor emits voices, voice data are acquired by the sound collection units 41 to 46. The sound collection units 41 to 46 output their respective voice data to the control unit 80.

The speech analysis unit 80*a* of the control unit 80 performs a process of analyzing the voice data acquired by the sound collection units 41 to 46. Specifically, the speech analysis unit 80*a* identifies the spatial position or direction of the sound source from which the voice is emitted, based on the voice data from the sound collection units 41 to 46. For example, when a trained model for machine learning is installed in the neck-mounted device 100, the speech analysis unit 80*a* can identify the position or direction of the sound source by using the voice data from the sound collection units 41 to 46 by referring to the trained model. Alternatively, since the distances between the sound collection units 41 to 46 are known, the speech analysis unit 80*a* may calculate distances from the sound collection units 41 to 46 to the sound source based on the time differences when the voice reaches the sound collection units 41 to 46 and identify the spatial position or direction of the sound source by a triangular survey by using the distances. By the triangular survey, when the distances from the sound collection units of at least three positions to the sound source are identified, the spatial position or direction of the sound source can be identified. Therefore, the position or the like of the sound source can be identified from only the voice data acquired by the first sound collection unit 41 to the third sound collection unit 43 on the left arm portion 10, and similarly, the position or the like of the sound source can be identified from only the voice data acquired by the fourth sound collection unit 44 to the sixth sound collection unit 46 on the right arm portion 20.

Further, the speech analysis unit 80*a* determines whether or not the position or direction of the sound source identified by the above process matches a position or direction presumed to be the mouth of the wearer or the mouth of the interlocutor. For example, since the positional relationship between the neck-mounted device 100 and the wearer's mouth and the positional relationship between the neck-mounted device 100 and the mouth of the interlocutor can be assumed in advance, when the sound source is located within the assumed range, it may be determined that the sound source is the mouth of the wearer or the interlocutor. Further, when the sound source is located significantly below, above, or behind the neck-mounted device 100, it can be determined that the sound source is not the mouth of the wearer or the interlocutor.

Next, the speech processing unit 80*b* of the control unit 80 performs a process of emphasizing or suppressing a sound component included in the voice data based on the position or direction of the sound source identified by the speech analysis unit 80*a*. Specifically, if the position or direction of the sound source matches the position or direction presumed to be the mouth of the wearer or the interlocutor, the sound component emitted from the sound source is emphasized. On the other hand, if the position or direction of the sound source does not match the mouth of the wearer or the interlocutor, the sound component emitted from the sound source may be regarded as noise and the sound component may be suppressed. As described above, in the present invention, the beamforming process is performed in which omnidirectional sound data is acquired by using the plurality of omnidirectional microphones and a specific sound component is emphasized or suppressed by speech processing on the software of the control unit 80. This makes it possible to acquire the voice of the wearer and the voice of the interlocutor at the same time, and emphasize the sound components of the voices as needed.

Subsequently, with reference to FIG. 5, a range in which the beamforming of the interlocutor's voice can be appropriately performed will be described. As illustrated in FIG. 5(*a*), when the interlocutor is located in the front side of the wearer, the voice emitted from the interlocutor linearly reaches all of the six sound collection units 41 to 46 mounted to the neck-mounted device 100. In this case, as described above, the beamforming process for emphasizing the voice emitted from the interlocutor can be performed. As illustrated in FIG. 5(*a*), for example, when the interlocutor is located in the right side of the wearer, for the voice emitted from the interlocutor in the right side, the beamforming process can be performed when the voice can be acquired by at least three sound collection units 44 to 46 disposed on the right arm portion 20 of the neck-mounted device 100. The same applies to the case where the interlocutor is located in the left side of the wearer. Thus, in the present invention, since the sound collection units 41 to 46 are disposed to the left arm portion 10 and the right arm portion 20 at three positions for each arm portion, even only the sound collection units 41 to 43 on the left arm portion 10 or only the sound collection units 44 to 46 on the right arm portion 20 can deal with the voice of the interlocutor present in the right or left of the wearer.

As illustrated in FIG. 5(*b*), even when the interlocutor is located in the right or left at the rear of the wearer, the beamforming process can be performed when the voice of the interlocutor can be acquired by the three or more sound collection units among the sound collection units 41 to 43 on the left arm portion 10 or the sound collection units 44 to 46 on the right arm portion 20. Furthermore, in the preferred embodiment of the present invention, the seventh sound collection unit 47 is disposed at the position corresponding to the back of the wearer's neck. Therefore, even when the interlocutor is located almost directly behind the wearer, when the voice emitted from the interlocutor linearly reaches at least two (for example, third sound collection unit 43, sixth sound collection unit 46) among the first sound collection unit 41 to the sixth sound collection unit 46 and the seventh sound collection unit 47, the beamforming process can be performed by these three or more sound collection units. In view of this, in the configuration in which the sound collection units 41 to 46 are disposed at three positions for each of the left arm portion 10 and the right arm portion 20, and the seventh sound collection unit 47 is further additionally disposed to the main body portion 30, the beamforming can be performed in all directions (about 360 degrees) around the wearer. In this case, a blind area in which the beamforming cannot be performed is not present.

Thus, for appropriately performing the beamforming process, it is necessary that the voice of the interlocutor linearly reaches the three or more sound collection units. In considering the restriction, with the configuration in which the sound collection units are disposed at three positions (six positions in total) for each of the left and right arm portions 10, 20 of the neck-mounted device 100, the audible range in which the beamforming can be appropriately performed to the voice of the interlocutor can be expanded to a wide range excluding the rear of the wearer. Specifically, by disposing the sound collection units 41 to 46 at three positions for each of the left and right arm portions 10, 20, the audible range enabling the beamforming can be expanded to about 260 degrees or more, preferably 320 degrees or more in the front of the wearer's eyes. Thus, both right and left sides of the wearer can be almost completely included in the audible range. Therefore, the voice of not only the interlocutor having a conversation face-to-face with the wearer but also the interlocutor having a conversation side-by-side with the wearer can be appropriately acquired. Additionally, by disposing the seventh sound collection unit 47 to the main body portion 30 in addition to the above-described sound collection units 41 to 46, the beamforming can be performed to an area (especially, wearer's back) that cannot be dealt with by only the sound collection units 41 to 46 of the left and right arm portions 10, 20.

Subsequently, with reference to FIG. 6, a case of a conversation between three persons in total, the wearer of the neck-mounted device 100 and two interlocutors not wearing the neck-mounted device will be described. In the example illustrated in FIG. 6, for convenience, it is assumed that three persons in the conversation are located at respective apices of a regular triangle in plan view, and the relative positions of the three persons do not change. However, even when the relative positions of the three persons change over time, it is only necessary to regularly identify the positions from the voices of the respective speakers and trace the changed positions of the respective speakers. In FIG. 6, the interlocutor located in the left arm portion 10 side is defined as a "first interlocutor," and the interlocutor located in the right arm portion 20 side is defined as a "second interlocutor" viewing from the "wearer."

Thus, in the conversation between three persons, it is assumed that the first interlocutor and the second interlocutor simultaneously speak. FIG. 7 illustrates an example of the beamforming process in this case. That is, in the neck-mounted device 100 according to the present invention, first, the speech analysis unit 80a identifies the position or the direction of the sound source of the first interlocutor's voice using first voice data acquired by the first sound collection unit 41 to the third sound collection unit 43 on the left arm portion 10 (S1). The speech processing unit 80b performs a process of emphasizing a vocal component of the identified first interlocutor to the first voice data (S2). Similarly, the speech analysis unit 80a identifies the position or the direction of the sound source of the second interlocutor's voice using second voice data acquired by the fourth sound collection unit 44 to the sixth sound collection unit 46 on the right arm portion 20 (S1). The speech processing unit 80b performs a process of emphasizing a vocal component of the identified second interlocutor to the second voice data (S2). Thus, in the conversation between three persons, it is preferred that the three sound collection units 41 to 43 on the left arm portion 10 and the three sound collection units 44 to 46 on the right arm portion 20 are independently used, the first voice data acquired by the sound collection units 41 to 43 on the left arm portion 10 is separated from the second voice data acquired by the sound collection units 44 to 46 on the right arm portion 20, and then, the speech processing is performed to each of the voice data.

Furthermore, in the neck-mounted device 100 according to the present invention, processing for suppressing the respective intersecting sound components can be performed together with the above-described voice emphasizing process. That is, in the first voice data acquired by the sound collection units 41 to 43 on the left arm portion 10, the vocal component of the first interlocutor is emphasized as described above, while the first voice data includes other components such as the vocal component of the second interlocutor. Meanwhile, for the vocal component of the second interlocutor, the emphasizing process has been already performed in the second voice data acquired by the sound collection units 4 to 43 on the right arm portion 20. Therefore, as illustrated in FIG. 7, the speech processing unit 80b suppresses the vocal component of the second interlocutor in the first voice data using the vocal component of the second interlocutor emphasized in the second voice data (S3). Similarly, the speech processing unit 80b suppresses the vocal component of the first interlocutor in the second voice data using the vocal component of the first interlocutor emphasized in the first voice data (S3). Accordingly, in the first voice data acquired by the sound collection units 41 to 43 on the left arm portion 10, the vocal component of the first interlocutor is emphasized, and the vocal component of the second interlocutor is suppressed. In the second voice data acquired by the sound collection units 44 to 46 on the right arm portion 20, the vocal component of the second interlocutor is emphasized, and the vocal component of the first interlocutor is suppressed. Thus, by independently using the sound collection units 41 to 43 of the left arm portion 10 and the sound collection units 44 to 46 of the right arm portion 20, the separation performance of the vocal components of the respective speakers can be improved even when the first interlocutor and the second interlocutor simultaneously speak.

As the signal processing for suppressing the vocal component, a known processing method can be used as necessary, and most simply, spectral subtraction may be performed. For example, the emphasized voice of the second interlocutor is subtracted from the emphasized voice of the first interlocutor in a time-frequency domain, and the subtraction result is used as a final result. However, in a simple spectral subtraction, there has been known a side effect referred to as a musical noise, and another process capable of reducing the side effect can be used together. The process for reducing the musical noise is generally a process in a category referred to as a noise reduction process with reference signal, and for example, Minimum Mean-Square-Error (MMSE) method, Maximum a Posteriori (MAP) method, and the like are known. Additionally, a process using an "adaptive filter" included in what is called an echo cancellation process can be used. For example, when the MMSE method or the MAP method is used, the voice emphasizing process is performed to each of 3 channels of the first voice data acquired by the sound collection units 41 to 43 of the left arm portion 10 and 3 channels of the second voice data acquired by the sound collection units 44 to 46 of the right arm portion 30, and 1 channel of reference signal is acquired from each of the voice data, and then, the suppressing process between the reference signals is performed, thereby obtaining the final result in which the vocal component of the first interlocutor is separated from the vocal component of the second interlocutor. When the process using an "adaptive filter" is used, the voice emphasizing process is performed to each of 3 channels of the first voice data acquired by the sound collection units 41 to 43 of the left arm portion 10 and 3 channels of the second voice data acquired by the sound collection units 44 to 46 of the right arm portion 30, and 1 channel of reference signal is acquired from each of the voice data. Then, the adaptive filters of respective channels are applied to the original 3 channels of the voice data, thereby generating new 3 channels of voice data in which the vocal component derived from the different interlocutor is removed from the original 3 channels of voice data. Then, it is only necessary that the voice emphasizing process is performed to the new voice data, thereby obtaining the 1 channel of the final result in which the vocal component of the first interlocutor is separated from the vocal component of the second interlocutor.

For the case where the voice of the interlocutor is acquired, it is preferable to activate the image capture unit 60 to shoot the interlocutor. Specifically, the wearer performs a predetermined gesture with a finger(s) of the wearer within the detection range of the non-contact type of sensor unit 70. The gesture includes performing a predetermined movement with finger(s) and forming a predetermined shape with finger(s). When the sensor unit 70 detects the movement of the finger(s), the input analysis unit 80c of the control unit 80 analyzes the detection information from the sensor unit 70 to determine whether or not the gesture of the wearer's finger(s) matches a preset gesture. For example, predetermined gestures related to the control of the image capture unit 60 are preset such as a gesture for activating the image capture unit 60, a gesture for starting shooting with the image capture unit 60, and a gesture for stopping the shooting, and the input analysis unit 80c determines whether or not the wearer's gesture matches any one of the above-mentioned predetermined gestures based on the detection information from the sensor unit 70.

Next, the image capture control unit 80d of the control unit 80 controls the image capture unit 60 based on the result of analysis by the input analysis unit 80c. For example, when the input analysis unit 80c determines that the wearer's gesture matches the gesture for activating the image capture unit 60, the image capture control unit 80d activates the image capture unit 60. If the input analysis unit 80c determines that the wearer's gesture matches the gesture for starting shooting after the image capture unit 60 is activated, the image capture control unit 80d controls the image capture unit 60 to start shooting an image. Further, if the input analysis unit 80c determines that the wearer's gesture matches the gesture for stopping the shooting after the shooting is started, the image capture control unit 80d controls the image capture unit 60 to stop the shooting of an image. In addition, the image capture control unit 80d may put the image capture unit 60 into the sleep state again when a certain period of time has elapsed after the shooting is stopped.

The image analysis unit 80e of the control unit 80 analyzes the image data of the still image or the moving image acquired by the image capture unit 60. For example, the image analysis unit 80e can identify the distance from the neck-mounted device 100 to the mouth of the interlocutor and the positional relationship between the two by analyzing the image data. Further, the image analysis unit 80e can analyze whether or not the interlocutor's mouth is open or whether or not the interlocutor's mouth is opened and closed based on the image data, so that it is also possible to identify whether or not the interlocutor is speaking. The result of analysis by the image analysis unit 80e is used for the above-mentioned beamforming process. Specifically, by using the result of analysis of the image data by the image capture unit 60 in addition to the results of analysis of the voice data collected by the sound collection units 41 to 47, the accuracy of the process of identifying the spatial position and direction of the interlocutor's mouth can be improved. In addition, by analyzing the movement of the interlocutor's mouth included in the image data and identifying that the interlocutor is speaking, the accuracy of the process of emphasizing the voice emitted from the interlocutor's mouth can be improved.

The voice data processed by the speech processing unit 80b and the image data acquired by the image capture unit 60 are stored in the storage unit 81. Further, the control unit 80 can also transmit the processed voice data and the image data to a server device on the cloud or another neck-mounted device 100 through the communication unit 82. The server device can also perform a speech-to-text conversion process, a translation process, statistical processing, and any other language processing based on the voice data received from the neck-mounted device 100. In addition, the image data acquired by the image capture unit 60 can be used to improve the accuracy of the above-described language processing. Further, the server device can improve the accuracy of the trained model by using the voice data and the image data received from the neck-mounted device 100 as teacher data for machine learning. Further, a remote call may be made between the wearers by transmitting and receiving voice data between the neck-mounted devices 100. In this case, voice data may be directly transmitted and received between the neck-mounted devices 100 through proximity wireless communication, or voice data may be transmitted and received between the neck-mounted devices 100 via the Internet through the server device.

In the specification of the present application, an embodiment has been described in which the neck-mounted device 100 mainly includes the speech analysis unit 80a, the speech processing unit 80b, and the image analysis unit 80e, which serve as functional components, to perform the beamforming process locally. However, one, some, or all of the functions of the speech analysis unit 80a, the speech processing unit 80b, and the image analysis unit 80e can be shared by a server device on the cloud connected to the neck-mounted device 100 via the Internet. In this case, for example, the neck-mounted device 100 may transmit the voice data acquired by the sound collection units 41 to 47 to the server device, and the server device may identify the position or direction of the sound source or emphasize the voice of the wearer or the interlocutor and suppress other noise to perform speech processing. Further, the image data acquired by the image capture unit 60 may be transmitted from the neck-mounted device 100 to the server device, and the server device may perform a process of analyzing the image data. In this case, a speech processing system is constructed of the neck-mounted device 100 and the server device.

As described above, in the present specification, the embodiment of the present invention has been described with reference to the drawings in order to express the contents of the present invention. However, the present invention is not limited to the above-described embodiment, but includes modifications and improvements obvious to those skilled in the art based on the matters described in the present specification.

In addition, the shooting method to be performed by the image capture unit 60 may be controlled based on the detection information from the sensor unit 70. Specifically, examples of the shooting method of the image capture unit 60 include still image shooting, moving image shooting, slow motion shooting, panoramic shooting, time-lapse shooting, timer shooting, and the like. When the sensor unit 70 detects the movement of the finger(s), the input analysis unit 80c of the control unit 80 analyzes the detection information from the sensor unit 70 to determine whether or not the gesture of the wearer's finger(s) matches a preset gesture. For example, a unique gesture is set for each shooting method of the image capture unit 60, and the input analysis unit 80c determines whether or not the wearer's gesture matches a preset gesture based on the detection information from the sensor unit 70. The image capture control unit 80d controls the shooting method to be performed by the image capture unit 60 based on the result of analysis by the input analysis unit 80c. For example, when the input analysis unit 80c determines that the wearer's gesture matches a gesture for still image shooting, the image capture control unit 80d controls the image capture unit 60 to shoot a still image. Alternatively, when the input analysis unit 80c determines that the wearer's gesture matches a gesture for moving image shooting, the image capture control unit 80d controls the image capture unit 60 to shoot a moving image. In this way, it is possible to identify the shooting method by the image capture unit 60 according to the gesture of the wearer.

Further, in the above-described embodiment, although the image capture unit 60 is mainly controlled based on the detection information from the sensor unit 70, the sound collection units 41 to 47 may also be controlled based on the detection information from the sensor unit 70. For example, a unique gesture related to the start or stop of sound collection by the sound collection units 41 to 47 is preset, and the input analysis unit 80c determines whether or not the wearer's gesture matches a preset gesture based on the detection information from the sensor unit 70. Then, when a gesture related to the start or stop of sound collection is detected, the sound collection units 41 to 47 may start or stop the sound collection according to the detection information of that gesture.

Further, in the above-described embodiment, although the image capture unit 60 is mainly controlled based on the detection information from the sensor unit 70, the image capture unit 60 may also be controlled based on the voice information input to the sound collection units 41 to 47. Specifically, the speech analysis unit 80a analyzes the voices acquired by the sound collection units 41 to 47. Specifically, voice recognition is performed on the voice of the wearer or the interlocutor, and it is determined whether or not that voice is related to the control of the image capture unit 60. After that, the image capture control unit 80d controls the image capture unit 60 based on the result of analysis of the voice. For example, when a predetermined voice related to the start of shooting is input to the sound collection units 41 to 47, the image capture control unit 80d activates the image capture unit 60 to start shooting. Further, when a predetermined voice for identifying a shooting method to be performed by the image capture unit 60 is input to the sound collection units 41 to 47, the image capture control unit 80d controls the image capture unit 60 to execute the identified shooting method. In addition, after the sound collection units 41 to 47 are activated based on the detection information from the sensor unit 70, the image capture unit 60 may also be controlled based on the voice information input to the sound collection units 41 to 47.

Furthermore, the content of a control command based on the input information from the sensor unit 70 may also be changed according to the image captured by the image capture unit 60. Specifically, first, the image analysis unit 80e analyzes the image acquired by the image capture unit 60. For example, based on feature points included in the image, the image analysis unit 80a identifies whether it is an image in which a person appears, whether it is an image in which a specific subject (artificial object, natural object, etc.) appears, or the situation (shooting location, shooting time, weather, etc.) when the image was captured. Note that the person included in the image may be classified by gender or age, or may be identified as an individual.

Next, patterns of control commands based on gestures by the human finger(s) are stored in the storage unit 81 according to the types of images (types of person, subject, and situation). At this time, even for the same gesture, different control commands may be assigned depending on the types of images. Specifically, even for the same gesture, when a person appears in the image, the control command is for focusing the face of the person, and when a characteristic natural object appears in the image, the control command is for panoramic shooting of the surroundings of the natural object. In addition, the gender and age of the person appearing in the image, whether the subject is an artificial or natural object, or the shooting location, time, weather, and the like of the image may be detected from the image, and the meaning and content of a gesture may be differentiated depending on the result of detection. Then, the input analysis unit 80c refers to the image analysis result by the image analysis unit 80e, identifies the meaning and content corresponding to the image analysis result for the gesture detected by the sensor unit 70, and generates a control command to be input to the neck-mounted device 100. In this way, by changing the meaning and content of the gesture according to the content of the image, it is possible to input various types of control commands to the device based on the gesture according to the shooting situation and purpose of the image.

DESCRIPTION OF REFERENCE SIGNS

10 . . . left arm portion (first arm portion)
11 . . . flexible portion
12 . . . tip surface
13 . . . lower surface
14 . . . upper surface
20 . . . right arm portion (second arm portion)
21 . . . flexible portion
22 . . . tip surface
23 . . . lower surface
24 . . . upper surface
30 . . . main body portion
31 . . . hanging portion
32 . . . main body housing 32a . . . transmissive portion
32b . . . grill
41 . . . first sound collection unit
42 . . . second sound collection unit
43 . . . third sound collection unit
44 . . . fourth sound collection unit
45 . . . fifth sound collection unit
46 . . . sixth sound collection unit
47 . . . seventh sound collection unit
50 . . . operation unit
60 . . . image capture unit
70 . . . sensor unit
80 . . . control unit
80a . . . speech analysis unit
80b . . . speech processing unit
80c . . . input analysis unit
80d . . . image capture control unit
80e . . . image analysis unit
81 . . . storage unit
82 . . . communication unit
83 . . . proximity sensor
84 . . . sound emission unit
90 . . . battery
100 . . . neck-mounted device (audio-input device)

The invention claimed is:

1. An audio-input device comprising:
a first arm portion and a second arm portion configured to be located at positions across a target sound source;
a plurality of sound collection units disposed at three or more positions for each of the first arm portion and the second arm portion; and
a speech analysis unit configured, based on sounds acquired by each of the sound collection units, to identify a spatial position or direction of a sound source emitting the sound, wherein
the speech analysis unit identifies spatial positions or directions of separate sound sources, one of the separate sound sources is identified using the sounds acquired by the sound collection units disposed on the first arm portion and the other of the separate sound sources is identified using the sounds acquired by the sound collection units disposed on the second arm portion.

2. The audio-input device according to claim 1, wherein
the audio-input device is a neck-mounted device, and
the target sound source is a mouth of a wearer of the audio-input device.

3. The audio-input device according to claim 2, wherein
the speech analysis unit determines whether or not the sound source identified based on the sounds acquired by the sound collection units disposed on the first arm portion matches a mouth of a first interlocutor present in the first arm portion side of the wearer, and determines whether or not the sound source identified based on the sounds acquired by the sound collection units disposed on the second arm portion matches a mouth of a second interlocutor present in the second arm portion side of the wearer.

4. The audio-input device according to claim 1, further comprising
a speech processing unit that performs a process of emphasizing or suppressing a sound component included in voice data acquired by the sound collection units based on the position or the direction of the sound source identified by the speech analysis unit.

5. The audio-input device according to claim 4, wherein
the speech processing unit simultaneously performs the emphasizing process and the suppressing process of the sound components included in the voice data acquired by the sound collection units based on the position or the direction of the sound source identified by the speech analysis unit.

6. The audio-input device according to claim 1, wherein
the audio-input device is a neck-mounted device, and
the audio-input device further includes one or a plurality of sound collection units at positions corresponding to a back of a wearer's neck.

\* \* \* \* \*